United States Patent
Zhao et al.

(10) Patent No.: US 12,449,556 B2
(45) Date of Patent: Oct. 21, 2025

(54) AUTOMATIC SALT GEOMETRY DETECTION IN A SUBSURFACE VOLUME

(71) Applicant: Schlumberger Technology Corporation, Sugar Land, TX (US)

(72) Inventors: Tao Zhao, Houston, TX (US); Chunpeng Zhao, Houston, TX (US); Anisha Kaul, Houston, TX (US); Aria Abubakar, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 133 days.

(21) Appl. No.: 18/551,216

(22) PCT Filed: Mar. 17, 2022

(86) PCT No.: PCT/US2022/071195
§ 371 (c)(1),
(2) Date: Sep. 19, 2023

(87) PCT Pub. No.: WO2022/198220
PCT Pub. Date: Sep. 22, 2022

(65) Prior Publication Data
US 2024/0176036 A1    May 30, 2024

Related U.S. Application Data

(60) Provisional application No. 63/200,636, filed on Mar. 19, 2021.

(51) Int. Cl.
*G01V 1/28*    (2006.01)
*G01V 1/30*    (2006.01)
(Continued)

(52) U.S. Cl.
CPC .............. *G01V 1/282* (2013.01); *G01V 1/303* (2013.01); *G06N 3/0464* (2023.01); *G06N 3/08* (2013.01);
(Continued)

(58) Field of Classification Search
CPC .... G01V 1/282; G01V 1/303; G01V 2210/51; G01V 2210/6222; G01V 1/306;
(Continued)

(56) References Cited

U.S. PATENT DOCUMENTS

2017/0115412 A1 *  4/2017  Pixton .................... G01V 1/345
2019/0064378 A1 *  2/2019  Liu .......................... G01V 1/28
(Continued)

FOREIGN PATENT DOCUMENTS

| CA | 3214288 A1 * | 9/2022 | ............. E21B 43/00 |
| CN | 109799533 A * | 5/2019 | |
| WO | WO-2022198220 A1 * | 9/2022 | ............. E21B 43/00 |

*Primary Examiner* — Daniel Pihulic
(74) *Attorney, Agent, or Firm* — Jeffrey D. Frantz

(57) ABSTRACT

A method includes receiving seismic data and an initial velocity model, generating a first seismic image based at least in part on the seismic data and the initial velocity model, training a machine learning model to predict salt masks based at least in part on seismic images, merging the initial velocity model and the first salt mask to generate a first modified velocity model, generating an updated velocity model based at least in part on the first modified velocity model, generating a second seismic image based at least in part on the updated velocity model, predicting a second salt mask based at least in part on the second seismic image and the updated velocity model, using the trained machine learning model, and merging the updated velocity model and the second salt mask to generate a second modified velocity model.

20 Claims, 11 Drawing Sheets

(51) Int. Cl.
  *G06N 3/0464* (2023.01)
  *G06N 3/08* (2023.01)
(52) U.S. Cl.
  CPC .. *G01V 2210/51* (2013.01); *G01V 2210/6222* (2013.01)
(58) Field of Classification Search
  CPC .... G06N 3/0464; G06N 3/08; E21B 2200/20; E21B 2200/22; E21B 43/00
  See application file for complete search history.

(56) References Cited

U.S. PATENT DOCUMENTS

| | | | |
|---|---|---|---|
| 2020/0183047 A1* | 6/2020 | Denli | G01V 20/00 |
| 2024/0176036 A1* | 5/2024 | Zhao | G01V 1/306 |
| 2024/0210586 A1* | 6/2024 | Ye | G01V 1/345 |

\* cited by examiner

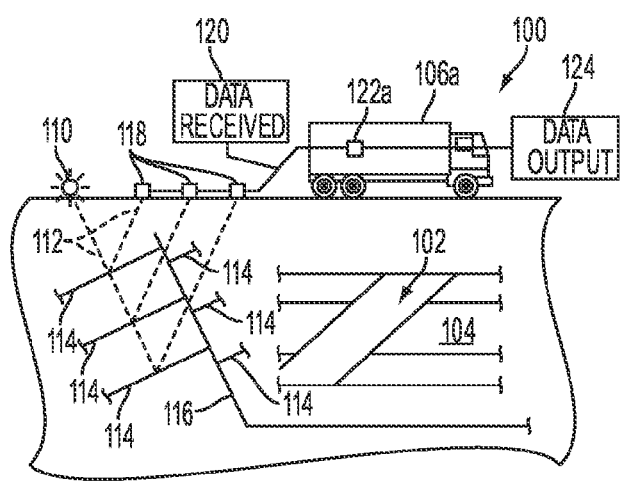
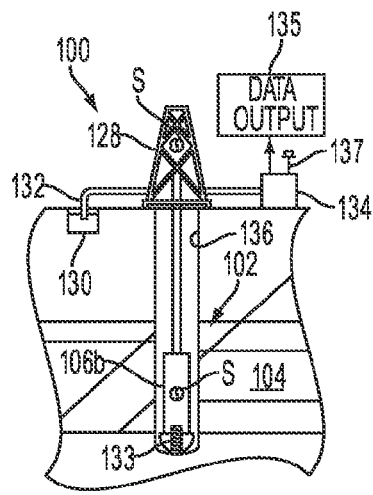
FIG. 1A
FIG. 1B
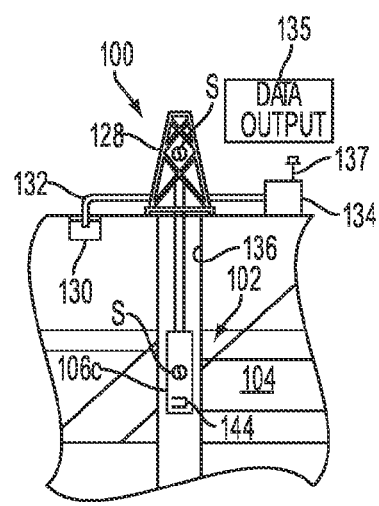
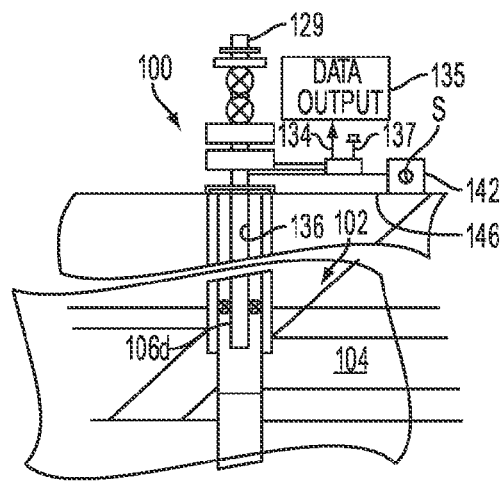
FIG. 1C
FIG. 1D

AUTOMATIC SALT GEOMETRY DETECTION IN A SUBSURFACE VOLUME

CROSS-REFERENCE TO RELATED APPLICATIONS

This application is a National Stage Entry of International Application No. PCT/US2022/071195, filed Mar. 17, 2022, which claims priority to U.S. Provisional Patent Application No. 63/200,636, filed on Mar. 19, 2021 and is incorporated herein by reference in its entirety.

BACKGROUND

Deep learning (DL)-based salt body detection has been a topic of extensive research and publication in recent years, because of its resemblance to the traditional image segmentation problems for which many DL methods were originally developed. However, much of the research has been on fully migrated seismic images and has not discussed the application of DL-based salt body detection in a seismic imaging framework.

In many regions, such as the Gulf of Mexico, subsalt imaging is used for hydrocarbon prospect exploration and exploitation. To obtain accurate salt geometry, earth model building techniques generally rely on a "top-down" approach. This type of approach iteratively floods the earth model with sediment and salt velocities and uses the tops and bases of salt horizons to incrementally update the salt geometry. Recent advances in the full waveform inversion (FWI) algorithms allow interpreters to shape the salt geometry and update the sediment velocity at the same time. However, it is not practical to run unlimited iterations of FWI to gradually shape the salt geometry. The practice thus employs an iterative exchange between manual interpretation and FWI to gradually shape the salt geometry and update the sediment velocity. After each loop of FWI and reverse time migration (RTM), interpreters manually pick new horizons that conform to the updated seismic image and the new salt geometry. This manual adjustment usually takes days to weeks and involves significant uncertainty in areas where there is little to no visual evidence for salt boundaries on the seismic image, such as salt flanks and the base of the salt.

SUMMARY

Embodiments of the disclosure include a method that includes receiving seismic data and an initial velocity model, generating a first seismic image based at least in part on the seismic data and the initial velocity model, training a machine learning model to predict salt masks based at least in part on seismic images, training including using a first salt mask and the seismic image as a training couple. The method also includes merging the initial velocity model and the first salt mask to generate a first modified velocity model, generating an updated velocity model based at least in part on the first modified velocity model, generating a second seismic image based at least in part on the updated velocity model, predicting a second salt mask based at least in part on the second seismic image and the updated velocity model, using the trained machine learning model, and merging the updated velocity model and the second salt mask to generate a second modified velocity model.

In at least some embodiments, the method includes visualizing the second modified velocity model, the second salt mask, or both for view by a human operator.

In at least some embodiments, generating the first seismic image comprises performing a reverse time migration of the seismic data based on the initial velocity model.

In at least some embodiments, generating the second seismic image comprises performing a reverse time migration of the seismic data based on the updated velocity model.

In at least some embodiments, the method further includes validating the second salt mask against one or more salt masks picked by a human interpreter.

In at least some embodiments, generating the updated velocity model includes performing a full waveform inversion of the first modified velocity model.

In at least some embodiments, the method also includes adjusting one or more parameters of the updated velocity model through parameterization.

In at least some embodiments, the method also includes generating the first salt mask based on input from a human-user based at least in part on the first seismic image.

Embodiments of the disclosure also include a computing system that includes one or more processors, and a memory system having one or more non-transitory, computer-readable media storing instructions that, when executed by at least one of the one or more processors, cause the computing system to perform operations. The operations include receiving seismic data and an initial velocity model, generating a first seismic image based at least in part on the seismic data and the initial velocity model, training a machine learning model to predict salt masks based at least in part on seismic images, training including using a first salt mask and the seismic image as a training couple. The operations also include merging the initial velocity model and the first salt mask to generate a first modified velocity model, generating an updated velocity model based at least in part on the first modified velocity model, generating a second seismic image based at least in part on the updated velocity model, predicting a second salt mask based at least in part on the second seismic image and the updated velocity model, using the trained machine learning model, and merging the updated velocity model and the second salt mask to generate a second modified velocity model.

Embodiments of the disclosure further include a non-transitory, computer-readable medium storing instructions that, when executed by at least one processor of a computing system, cause the computing system to perform operations. The operations include receiving seismic data and an initial velocity model, generating a first seismic image based at least in part on the seismic data and the initial velocity model, training a machine learning model to predict salt masks based at least in part on seismic images, training including using a first salt mask and the seismic image as a training couple. The operations also include merging the initial velocity model and the first salt mask to generate a first modified velocity model, generating an updated velocity model based at least in part on the first modified velocity model, generating a second seismic image based at least in part on the updated velocity model, predicting a second salt mask based at least in part on the second seismic image and the updated velocity model, using the trained machine learning model, and merging the updated velocity model and the second salt mask to generate a second modified velocity model.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

In FIG. 9A, there is a shallower base of salt, and in FIG. 9B, there is a deeper base of salt. Both velocity models are overlaid on the RTM image shown in FIG. 8A.

DESCRIPTION OF EMBODIMENTS

Figure 2:
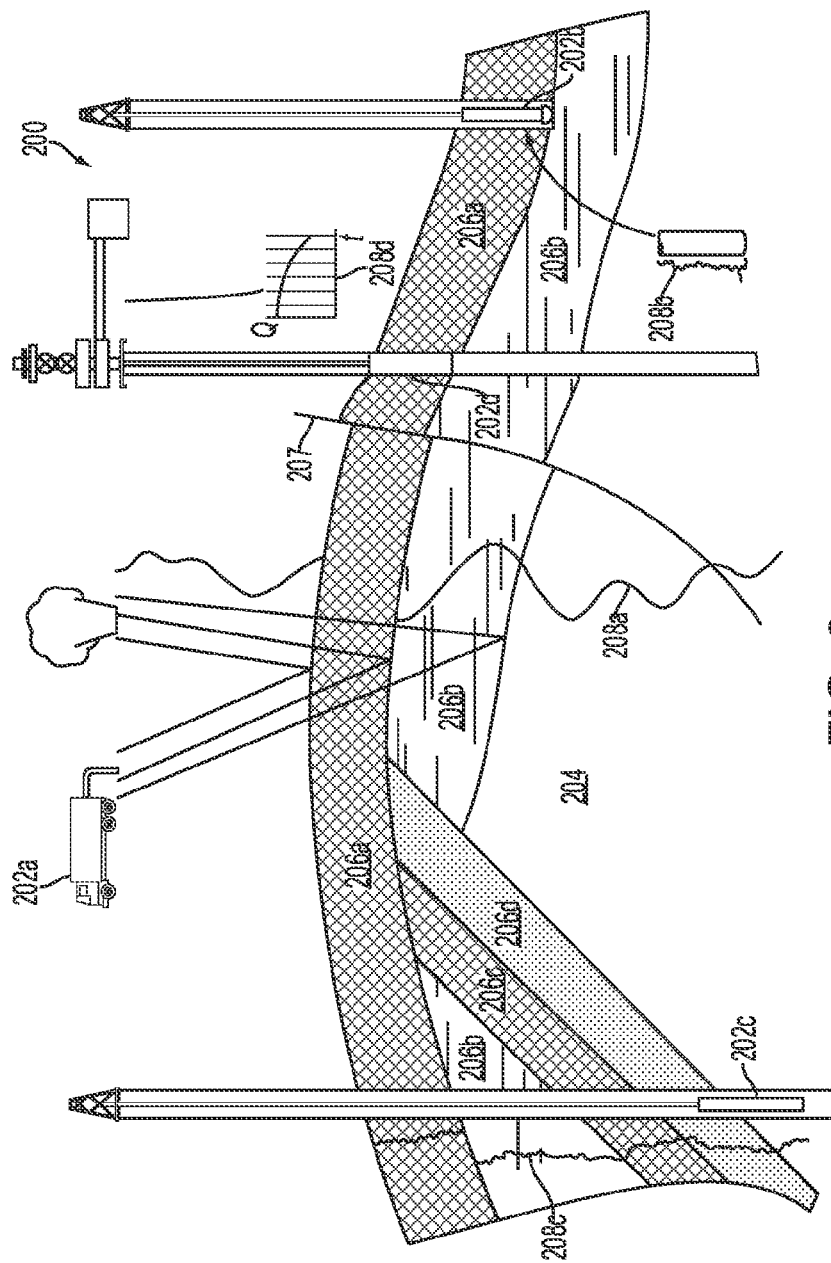

In some embodiments, systems, methods, and computer-readable media of the present disclosure may apply DL-based salt body detection in a full waveform inversion (FWI), reverse time migration (RTM) imaging systems and methods. In at least some embodiments, the systems and methods implement a deep-learning salt body detection, which reduces the turnaround time for salt update during seismic imaging, and provides for rapid scenario testing and localized seismic imaging.

Reference will now be made in detail to embodiments, examples of which are illustrated in the accompanying drawings and figures. In the following detailed description, numerous specific details are set forth in order to provide a thorough understanding of embodiments of the invention. However, it will be apparent to one of ordinary skill in the art that at least some embodiments of the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of embodiments of the invention. The first object and the second object are both objects, respectively, but they are not to be considered the same object.

The terminology used in the description of the at least some embodiments of the invention herein is for the purpose of describing particular embodiments only and is not intended to be limiting of the embodiments of the invention. As used in the description of at least some embodiments of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Although embodiments of the present disclosure are presented herein by reference to oilfield operations, one of skill in the art will recognize they can be readily applied to any other field in which subsurface characterization is useful. For example, other types of well construction (e.g., geothermal) and construction/structural engineering applications are possible, e.g., for renewable energy generation such as windfarms, solar arrays, etc.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106*b* may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106*c* suspended by rig 128 and into wellbore 136 of FIG. 1B. Wireline tool 106*c* is adapted for deployment into wellbore 136 for generating well logs, performing downhole tests and/or collecting samples. Wireline tool 106*c* may be used to provide another method and apparatus for performing a seismic survey operation. Wireline tool 106*c* may, for example, have an explosive, radioactive, electrical, or acoustic energy source 144 that sends and/or receives electrical signals to surrounding subterranean formations 102 and fluids therein.

Wireline tool 106*c* may be operatively connected to, for example, geophones 118 and a computer 122*a* of a seismic truck 106*a* of FIG. 1A. Wireline tool 106*c* may also provide data to surface unit 134. Surface unit 134 may collect data generated during the wireline operation and may produce data output 135 that may be stored or transmitted. Wireline tool 106*c* may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106*c* to measure downhole parameters which relate to, for example porosity, permeability, fluid composition and/or other parameters of the field operation.

FIG. 1D illustrates a production operation being performed by production tool 106*d* deployed from a production unit or Christmas tree 129 and into completed wellbore 136 for drawing fluid from the downhole reservoirs into surface facilities 142. The fluid flows from reservoir 104 through perforations in the casing (not shown) and into production tool 106*d* in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106*d* or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202a, 202b, 202c and 202d positioned at various locations along oilfield 200 for collecting data of subterranean formation 204 in accordance with implementations of various technologies and techniques described herein. Data acquisition tools 202a-202d may be the same as data acquisition tools 106a-106d of FIGS. 1A-1D, respectively, or others not depicted. As shown, data acquisition tools 202a-202d generate data plots or measurements 208a-208d, respectively. These data plots are depicted along oilfield 200 to demonstrate the data generated by the various operations.

Data plots 208a-208c are examples of static data plots that may be generated by data acquisition tools 202a-202c, respectively; however, it should be understood that data plots 208a-208c may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208b is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that typically provides a resistivity or other measurement of the formation at various depths.

A production decline curve or graph 208d is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206a-206d. As shown, this structure has several formations or layers, including a shale layer 206a, a carbonate layer 206b, a shale layer 206c and a sand layer 206d. A fault 207 extends through the shale layer 206a and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208a from data acquisition tool 202a is used by a geophysicist to determine characteristics of the subterranean formations and features. The core data shown in static plot 208b and/or log data from well log 208c are typically used by a geologist to determine various characteristics of the subterranean formation. The production data from graph 208d is typically used by the reservoir engineer to determine fluid flow reservoir characteristics. The data analyzed by the geologist, geophysicist and the reservoir engineer may be analyzed using modeling techniques.

Figure 3A:
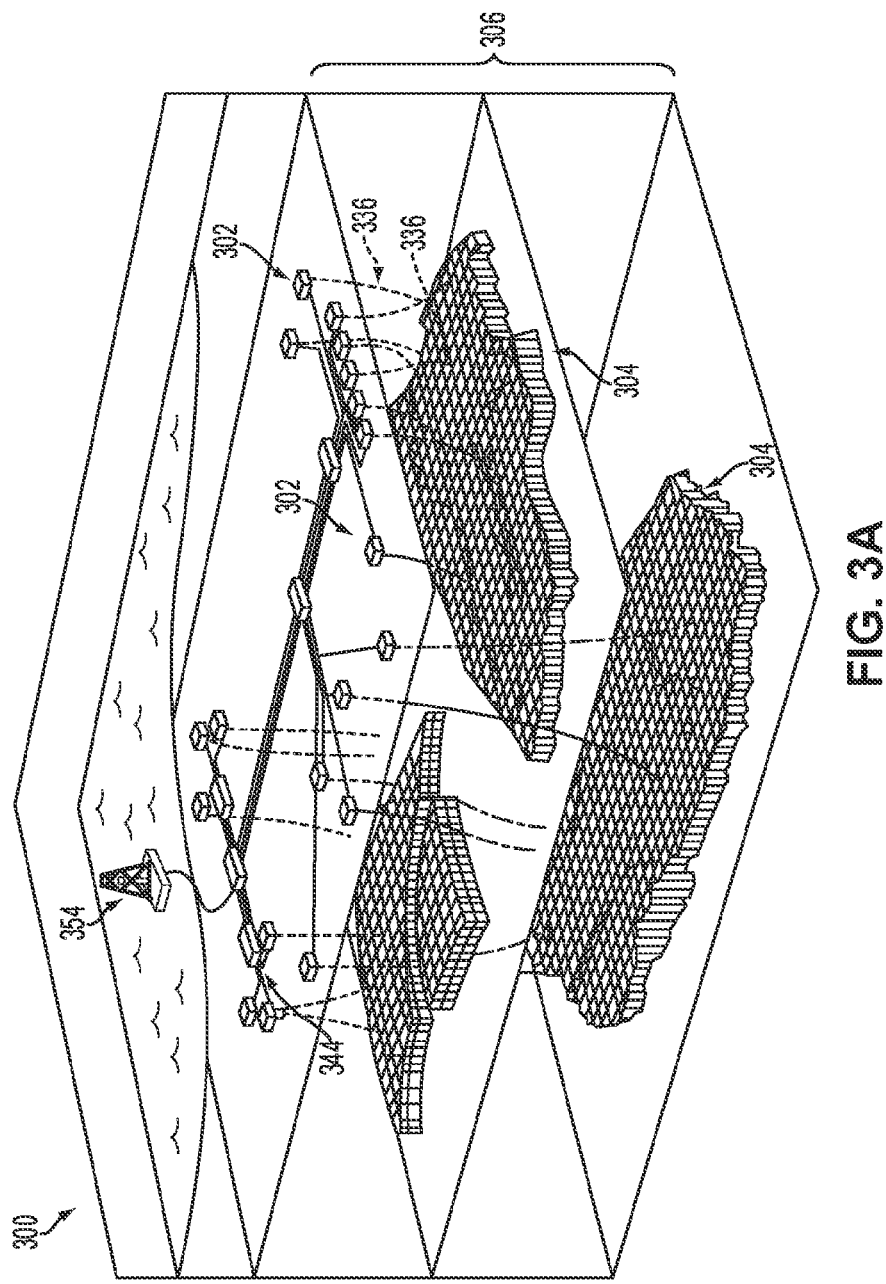

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
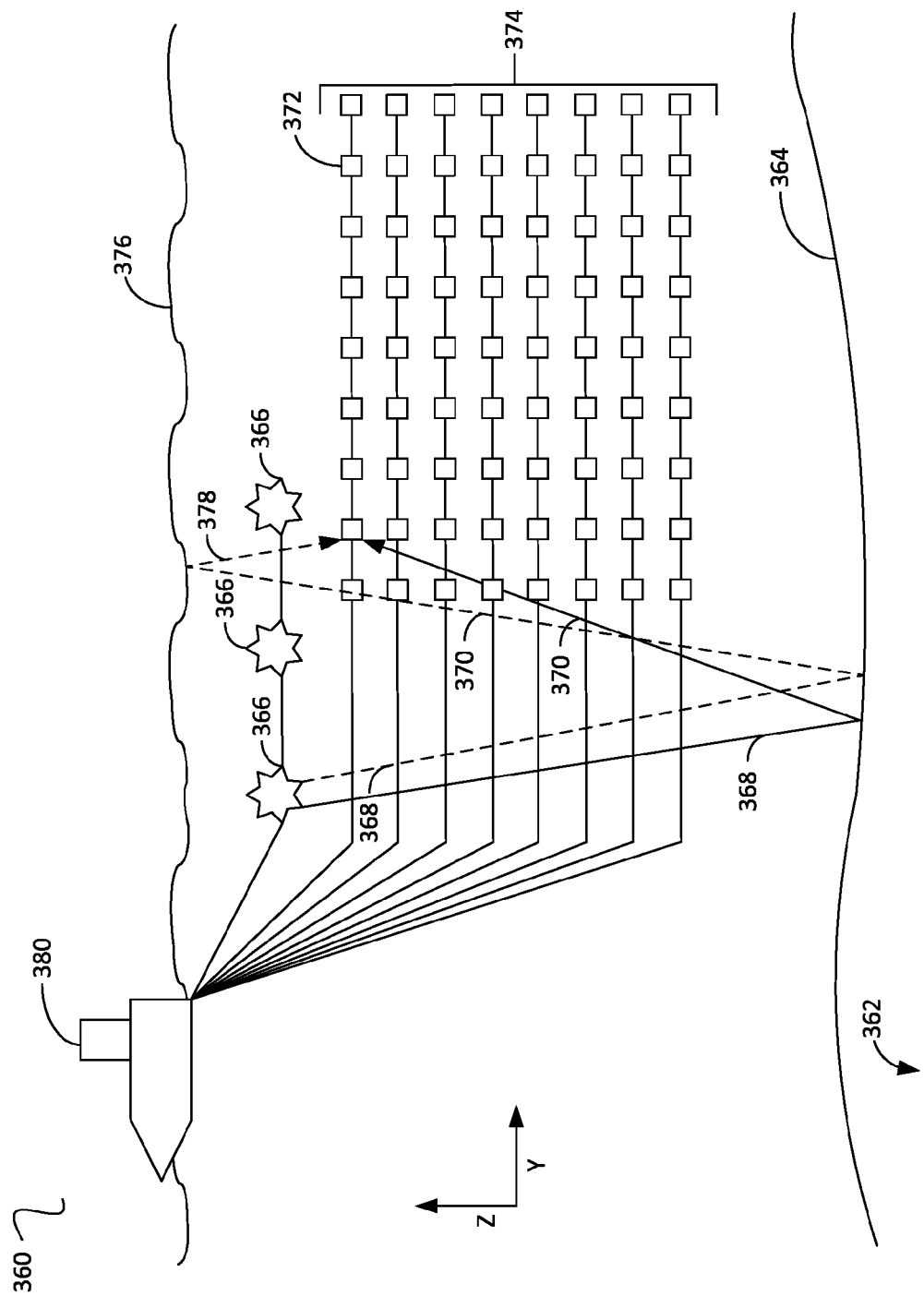

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362. Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Embodiments of the present disclosure may include identifying and updating salt geometry in a seismic image of a subsurface volume using machine learning (e.g., deep learning (DL)) automation. Salt geometry may be identified using salt masks picked on initial migration results or on legacy images which may be used as ground truths for training data, permitting a machine learning model to be trained to automatically update the salt geometry in subsequent imaging loops. Substituting interpreters' manual picking with DL-predicted salt bodies may reduce the time involved with the salt body interpretation process. Furthermore, this method may enable the velocity model updating loops to be fully automated, which may also shorten the turnaround time of the workflow and/or allow interpreters to spend more time on quality control and to focus their efforts on interpreting relatively more challenging areas.

Additionally, the DL predicted salt masks contain uncertainty information regarding the location of the salt boundaries. From these, multiple velocity models can be generated with different salt geometries by parameterization. These multiple versions of the velocity model permit geophysicists to perform scenario testing or localized seismic imaging (LSI) automatically and rapidly, which may be used for areas of high uncertainty and challenging interpretations. Hence, this array of DL predicted scenarios can serve as a reference and aid interpreters to reduce the uncertainty in challenging areas and improve the final image quality.

For the deep-learning technique, a convolutional neural network (CNN) may be used, for example, a CNN that is modified from U-net with residual blocks as the DL model for salt body detection. For a given seismic survey, because the change in seismic image is incremental between two imaging loops, the salt update problem may be unique, from computer vision perspective, in that the training data and data to predict are very similar. Therefore, the DL model may be configured to slightly favor memorization over generalization to seek improvements on the unique data. Large tiles of seismic images may be employed to take advantage of a large receptive field. Such large input tiles provide greater context to the CNN model but may be challenging for generalization, given the reduced training batch size.

Model parallelism may be employed to enable the use of large input tiles when training the CNN model. Model parallelism also allows a reduction in the number of "stitches" when assembling the predicted tiles into a whole seismic volume, and the associated artifacts along tile boundaries. For example, the CNN model may be trained with model parallelism on a Tensor Processing Unit (TPU), which may contain several, e.g., eight, TPU cores, and equally distributes the training sample to the cores.

Figure 4:
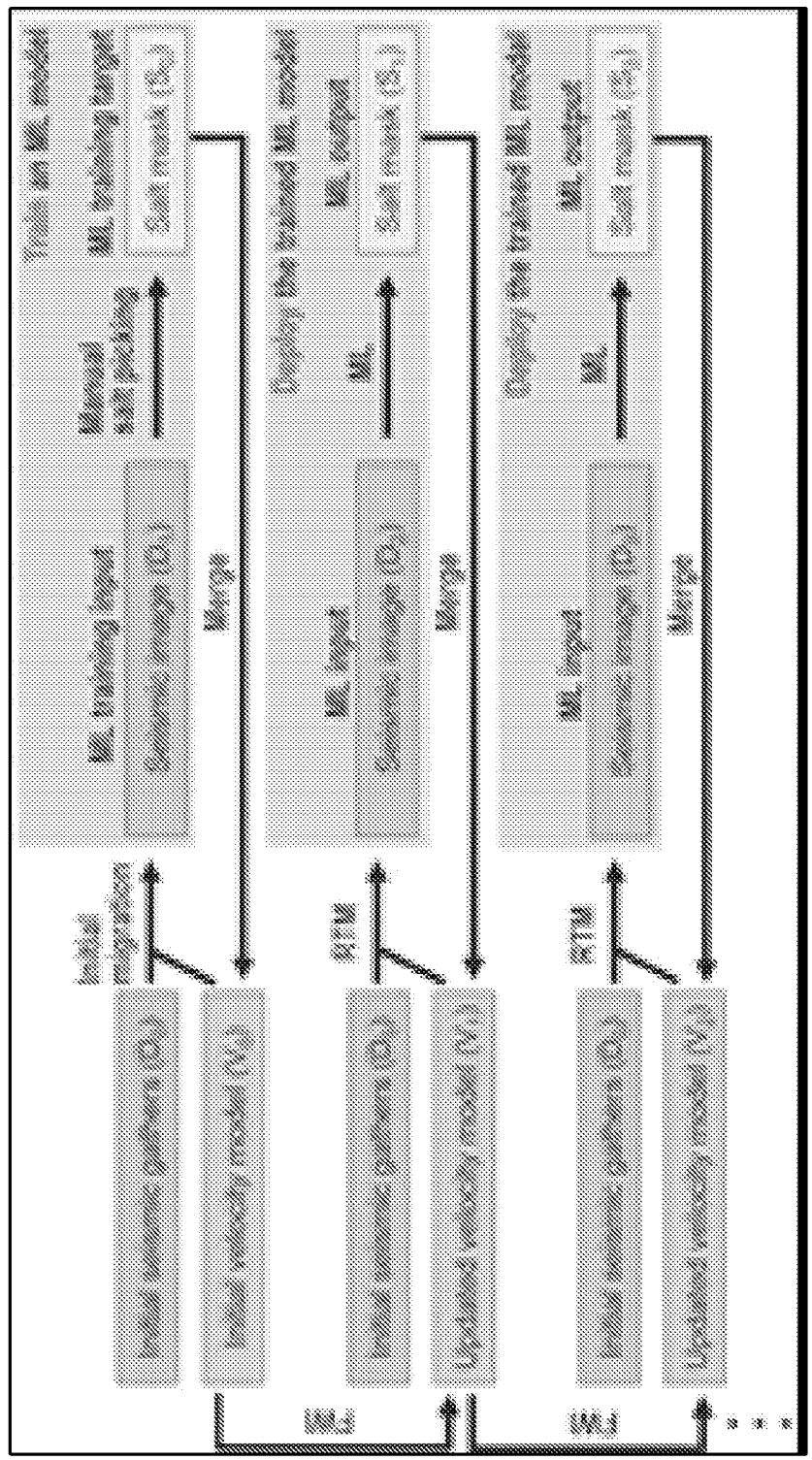
FIG. 4 illustrates a flowchart of a workflow for building a velocity model using machine learning, full waveform inversion, and reverse time migration, according to an embodiment.

FIG. 4 illustrates a flowchart of a workflow 400 for building a velocity model, using FWI-RTM and machine (e.g., deep) learning, according to an embodiment. The workflow 400 may begin by receiving data, for example, a seismic gather D0 (e.g., seismic data, images, etc. acquired from a seismic survey in a field) and an initial sedimentary velocity model V0. The initial sedimentary velocity model V0 may include one or more geologies, lithologies, and/or features, including salt features, identified therein. Such features may be identified using one or more of a variety of techniques that are available to skilled interpreters.

The seismic gather and the initial sedimentary velocity model may then be used in a reverse time migration (RTM) process in order to generate a seismic image D1. From the seismic image D1, a salt mask S1 may be identified. The salt mask S1 may be generated by a human interpreter and/or by a machine learning model. The salt mask S1 may, in some embodiments, be an image or other representation of the subsurface area represented by the input data, and may represent areas where a salt feature is believed to be located or at least probable. Indeed, the salt mask may be a segmentation of the seismic image, noting where salt features are located and where they are not located, or in other embodiments, may be a probability map that provides a range of confidence levels for whether a discrete element (e.g., pixel) represents a salt feature.

The salt mask S1 and the seismic image D1 may form one or more training couples (e.g., "ground truths") for a machine learning model. The machine learning model may be a convolutional neural network, any other deep learning model, or the like, and may be configured to predict salt feature locations (e.g., salt masks) based on a seismic image. Moreover, the seismic image D1 and the salt mask S1 may be fed thereto, thereby providing training specific to the particular subsurface volume currently under analysis, so as to tune the model for use with the present data.

The seismic image D1, resulting from the reverse time migration of the seismic gather D0, using the initial sedimentary velocity model V0, may be combined with the salt mask S1, so as to generate an initial velocity model V1. A full waveform inversion may be applied to seismic data, using the initial velocity model V1, to generate an updated velocity model V2. Another reverse time migration may be applied, using the updated velocity model V2 and the (same as initial) seismic gather D0, so as to generate another seismic image D2, which may represent a refinement of the prior seismic image D1.

The trained machine learning model may then be applied to perform an automatic salt picking, thereby generating a (e.g., "second") salt mask S2. In some embodiments, a human interpreter may also pick the salt mask, and the salt mask S2 may be compared with the salt mask picked by the human interpreter in order to validate and/or further train the machine learning model.

The salt mask S2 may be combined with the seismic image D2 to generate a modified velocity model V2$m$, and a full waveform inversion may be applied to seismic data using the modified velocity model V2$m$, so as to generate another updated velocity model V3. This process of reverse time migration, salt picking, merging the salt mask with the velocity model, and full waveform inversion may repeat, iteratively, as many times as desired, e.g., until some exit condition (e.g., consistency in successive salt masks or velocity models) is reached.

Figure 5:
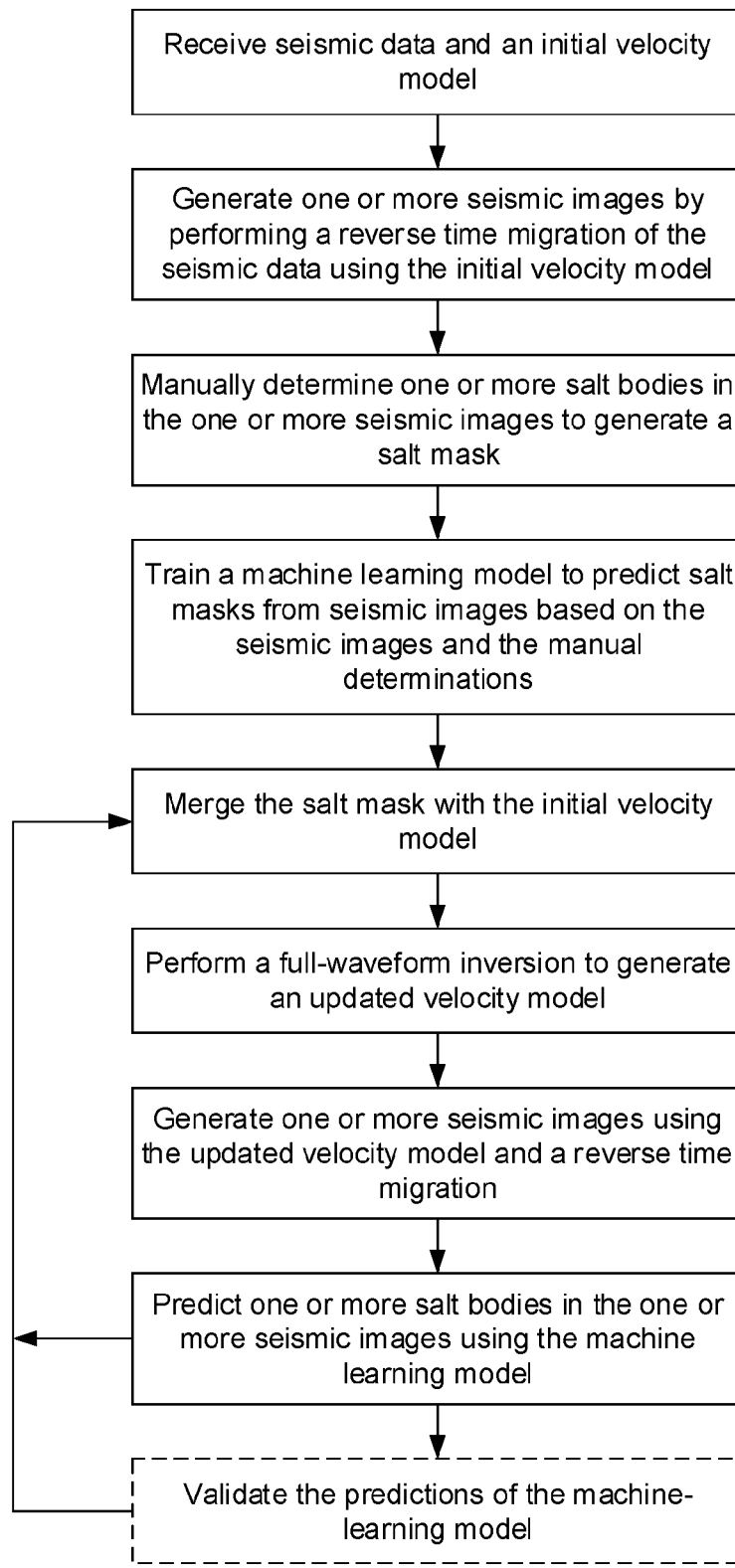
FIG. 5 illustrates a flowchart of a method for building a velocity model, e.g., implementing the workflow of FIG. 4, according to an embodiment.

FIG. 5 illustrates a flowchart of a method 500 for building a velocity model, using FWI-RTM and deep-learning (e.g., machine-learning) techniques, according to an embodiment. Once constructed, the velocity model may be used to generate seismic images representing a subterranean domain from seismic waveforms (gathers). These seismic images may, in turn, facilitate exploration, well planning, and/or drilling determinations by assisting in characterizing the subsurface volume. For example, the models may be visualized, so as to generate an image that is viewable on a display, such the method capitalizes on the processing capabilities of a computer implementing a machine learning model, and generates an image that was not previously available (or at least not available with the speed and efficiency of embodiments of the method 500).

The method 500 includes receiving seismic data representing a subsurface volume, e.g., one or more seismic gathers (e.g., images) collected in the field, using seismic receivers, as at 502. An initial velocity model (V1) of the subsurface volume may also be received or generated, as at 504, from a priori known information. As noted above, the initial velocity model V1 may be generated by processing that initiates with an initial sedimentary velocity model V0 and a salt mask S1 that is either contained within the initial sedimentary velocity model V0 or otherwise picked, e.g., through a manual picking process by a human interpreter.

The seismic images contained in the seismic data, along with the salt mask S1 may be used as training input for a deep-learning (or any other type of) machine learning model. The machine learning model may then be trained, as at 506, based on the seismic image and the salt mask, e.g., the labels generated by the human interpreters.

The method 500 may, at this point, enter a loop that may be iterated one or more times, with successive loops potentially producing a velocity model that has a higher level of refinement than the velocity model generated by the prior loop. Moreover, the loop may be at least partially automated, thereby avoiding or at least mitigating delays associated with waiting for a human interpreter.

In particular, the method 500 may include, as part of the loop, performing a full-waveform inversion of the seismic data, using the velocity model Vn (in the first iteration, Vn is the initial velocity model V1) to generate an updated velocity model Vn+1 (e.g., V2 in the first iteration of the loop), as at 508. In the initial iteration of the loop, this updated velocity model Vn+1 is generated by performing a full waveform inversion using the initial velocity model V1, which may be generated by combining the salt mask S1 with the initial sedimentary velocity model V0, as discussed above.

The method 500 may then proceed to generating one or more seismic images Dn+1 using the updated velocity model Vn+1, through a process of reverse time migration, as at 510. The method 500 may also include predicting one or more salt bodies Sn+1 in the one or more seismic images Dn+1 using the trained machine learning model, as at 512. In at least some embodiments, the output of the machine learning model, i.e., the salt mask, may be compared with a human identified salt mask (or a salt mask determined by another process), in order to validate the output of the machine learning model, as at 514. If the machine learning model's output does not match the human interpreter's, additional training couples may be generated to refine the machine learning model and potentially increase the accuracy thereof.

The method 500 may then proceed to merging the salt mask Dn+1 with the velocity model Vn+1 to generate a modified velocity model V(n+1)$m$, as at 516. This modified velocity model V(n+1)$m$ may be the output of the loop, and may be fed through to the next iteration of the loop. As such, e.g., for the second loop, the modified velocity model V2$m$ is an input. The method 500 may return to performing a full waveform inversion at 508, this time using the modified velocity model (e.g., V2$m$) to generate a new velocity model (e.g., V3 in the second iteration of the loop). The modified velocity model V3$m$ is the output. This loop may be repeated one or more times, as the loop counter 'n' increments for each iteration.

Once an exit condition is met, e.g., time, total number of iterations, velocity model quality, velocity model consistency between loops, etc., the method 500 may proceed to generating a visualization of the (e.g., last-generated) modified velocity model, the salt mask, or both. This, or these, visualizations may be presented on a graphical display of a computing device, e.g., in combination with (overlayed on) the seismic data that was acquired, or any other seismic attributes, in order to facilitate an efficient and accurate determination of the subsurface area of interest. This may permit operators to make determinations about oilfield and/or other types of activities, based on the presence of features in the subsurface.

Further, in at least some embodiments, the salt masks predicted by the machine learning model may have uncertainty associated therewith, e.g., quantified numerically and stored in association with specific locations. For regions with relatively high uncertainty, the method 500 may permit multiple scenarios to be run, thereby enabling operators to test different realizations. For example, multiple different velocity models can be generated from a salt mask by parameterization.

Experimental Example

Figure 6A:
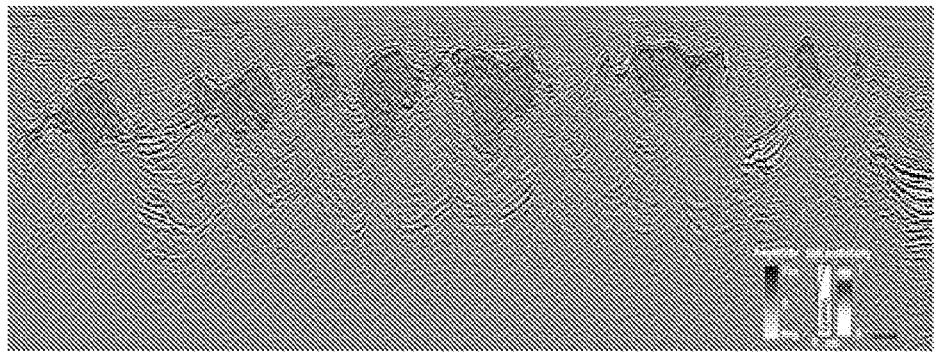
FIGS. 6A and 6B illustrate seismic images with corresponding salt masks picked by interpreters, according to an embodiment.
Figure 6B:
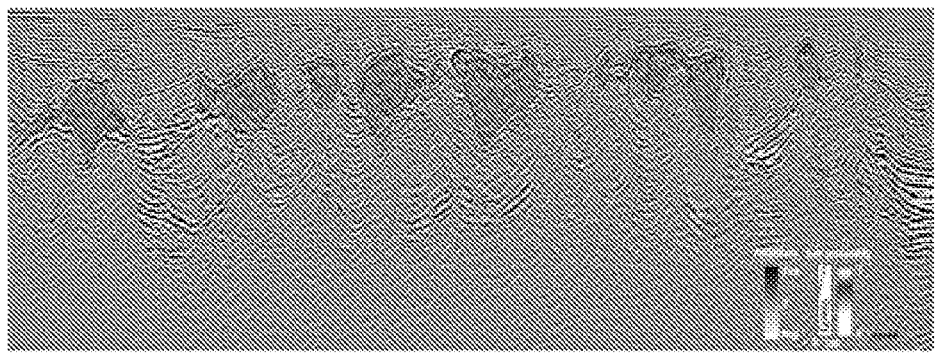

An embodiment of the present disclosure, which uses a DL-based automatic salt update in an FWI-RTM imaging workflow, was employed on a field dataset from the Gulf of Mexico. In this study, seismic images are obtained with corresponding interpreter-picked salt masks in both the initial imaging loop (Loop 1) and the next imaging loop (Loop 2). Before picking the salt masks on the RTM image in Loop 2, FWI is used to update the velocity model. In FIGS. 6A and 6B, there are shown example seismic sections from both imaging loops, overlaid with interpreter-picked salt masks. The salt geometry update is incremental between two consecutive imaging loops.

Figure 7A:
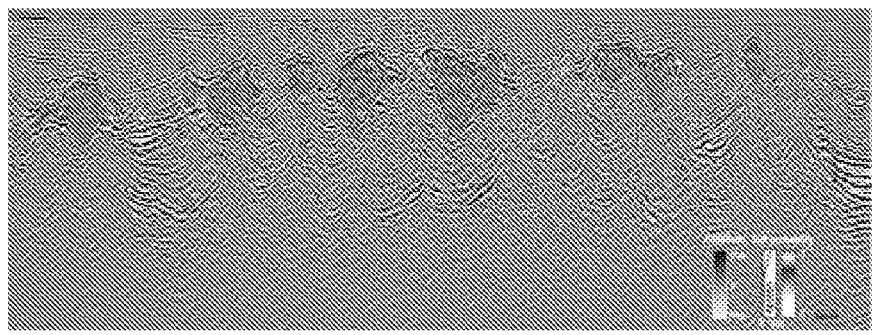
FIG. 7A illustrates a reverse time migration (RTM) image overlaid on a salt probability prediction map, according to an embodiment.
Figure 7B:
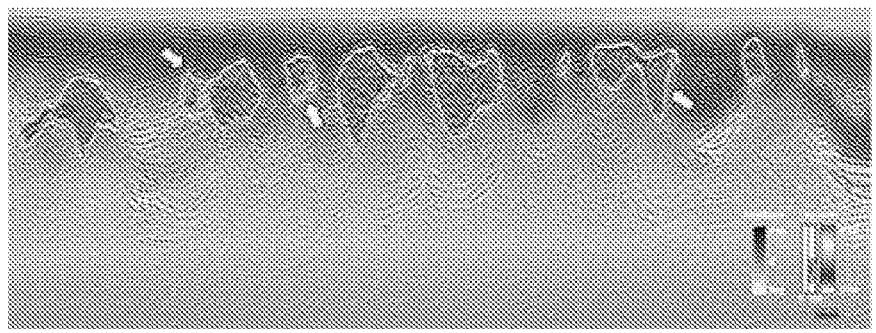
FIG. 7B illustrates an RTM image overlaid on a full waveform inversion (FWI) velocity model, according to an embodiment.
Figure 7C:
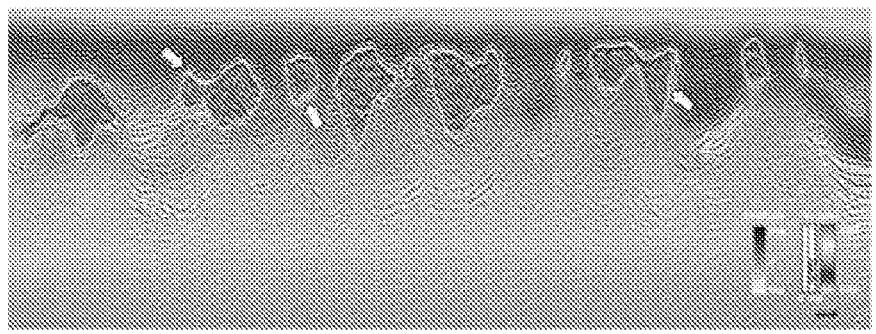
FIG. 7C illustrates the FWI inverted velocity model merged with the salt probability map, according to an embodiment.

The seismic image and corresponding salt mask from Loop 1 may be used as the input data and may be labeled to train the DL model. The trained DL model is then used to predict salt probability volume on the Loop 2 RTM image. The Loop 2 interpreter-picked salt mask is used to compare with the DL prediction for validation purpose. In FIG. 7A, there is shown the DL-predicted salt probability volume overlaid on the Loop 2 RTM image, along with the velocity model inverted from FWI (FIG. 7B), and the updated velocity model after merging the DL predicted salt geometry into the FWI inverted sediment velocity model (FIG. 7C).

When merging the updated salt geometry into the sediment velocity model, smoothing was applied along the salt boundary to mitigate any artifacts that may arise from the merging process. Therefore, although the predicted salt probability does not perfectly resemble an interpreter-picked salt mask, the actual impact of such difference on both FWI and RTM is acceptable. After merging the predicted salt probability with FWI inverted velocity, the updated velocity model is identical to the FWI inverted velocity in the sediment regions, and the salt geometry is changed. This velocity model, which contains the DL-based automatic salt update, is then used to obtain a new RTM image.

Figure 8A:
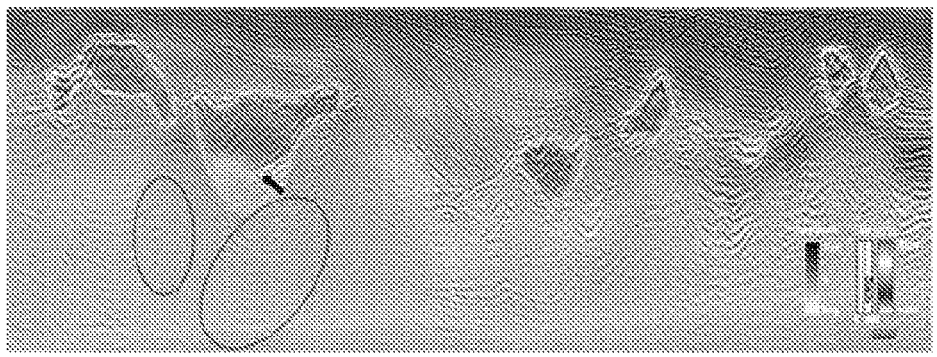
FIG. 8A illustrates an RTM image produced using a velocity model with a machine learning picked salt mask, overlaid with its corresponding velocity model.
Figure 8B:
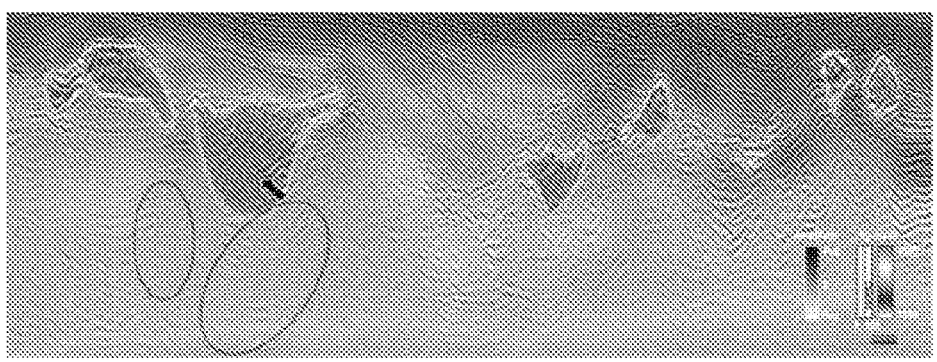
FIG. 8B illustrates an RTM image produced using the velocity model with a human interpreter picked salt update, overlaid with its corresponding velocity model.

FIGS. 8A and 8B show the RTM image obtained using the updated velocity model, as well as an RTM image using interpreter picked salt mask in the same production stage. The RTM images are overlaid with their corresponding velocity models. These two images are comparable in most places. For one of the large salt bodies on the left side, the DL predicted salt has a much shallower base 800 in FIG. 8A compared with the interpreter's pick in FIG. 8B 802. From the two RTM images, stronger evidence of base of salt for the DL predicted salt, as denoted by the black arrows, is seen. Due to the change in base of salt, the subsalt image in FIG. 8A appears more coherent than that in FIG. 8B (black ovals 804, 806). For example, in the subsequent version of the production image, the interpreter adjusted the base of the salt to a shallower location similar to the DL predicted salt (not shown here).

In this example, a location is highlighted where the DL prediction resulted in a more preferred salt geometry compared to the interpreter's pick, resulting in better image quality for this region. However, user editing may still be employed in some challenging regions. For the dataset used in this example, it takes two weeks for an interpreter to complete the Loop 2 salt update, whereas the DL-based salt update was computed in a day, including training the DL model. The interpreter can then perform quality control and ensure their effort is focused on addressing challenging areas, while still achieving a reduction on the total turnaround time.

Figure 9A:
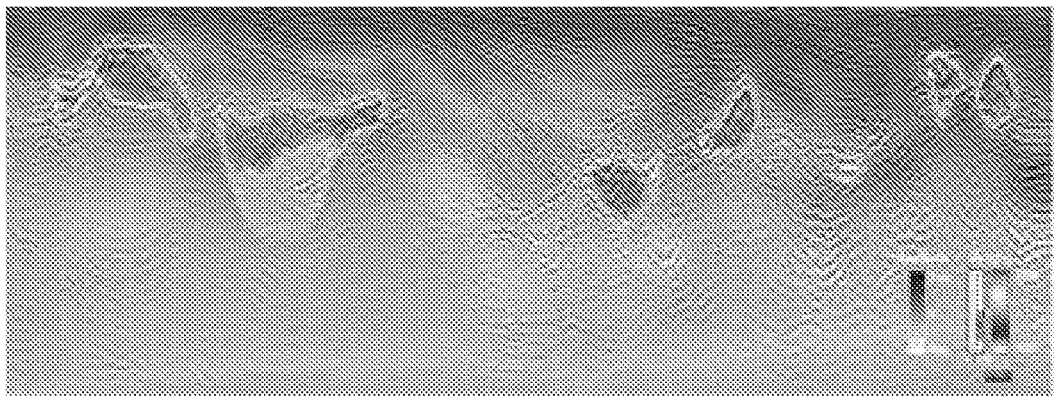
FIGS. 9A and 9B illustrate velocity models with another two salt scenarios.
Figure 9B:
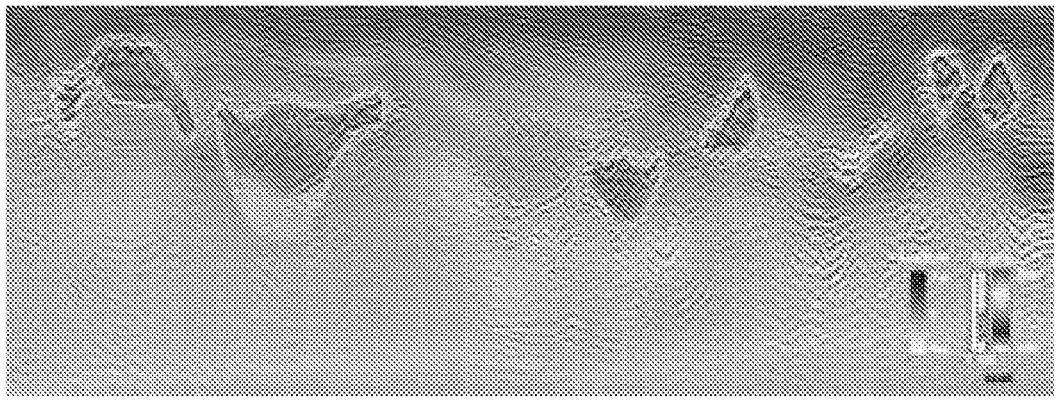

In addition to the improved efficiency, the DL-based salt update also provides for rapid scenario testing. Using the DL model uncertainty information, velocity models may be generated, with multiple versions of salt geometry to geophysicists for LSI tests, without solely relying on an interpreter's salt update. In FIGS. 8A and 8B, velocity models with another two salt scenarios derived from the same DL salt probability volume are shown, one with a shallower base of salt, and the other with a deeper base of salt than what is used in FIG. 8A. Interpreters can in turn use these different salt scenarios and LSI results to guide the interpretation in challenging areas, such as the base of salt marked in FIGS. 9A and 9B.

Accordingly, embodiments of the present disclosure may perform DL-based salt detection in a seismic imaging framework. Within an individual imaging loop, the DL-based automatic salt update can be used to reduce the salt interpretation total turnaround time from weeks to days. Using the model uncertainty information, velocity models with multiple salt scenarios can be generated through simple parameterization. Such different salt scenarios are helpful for rapid scenario testing and LSI, which can thereby help interpreters arrive at better salt interpretations and ensure improved imaging on the final volumes.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 10:
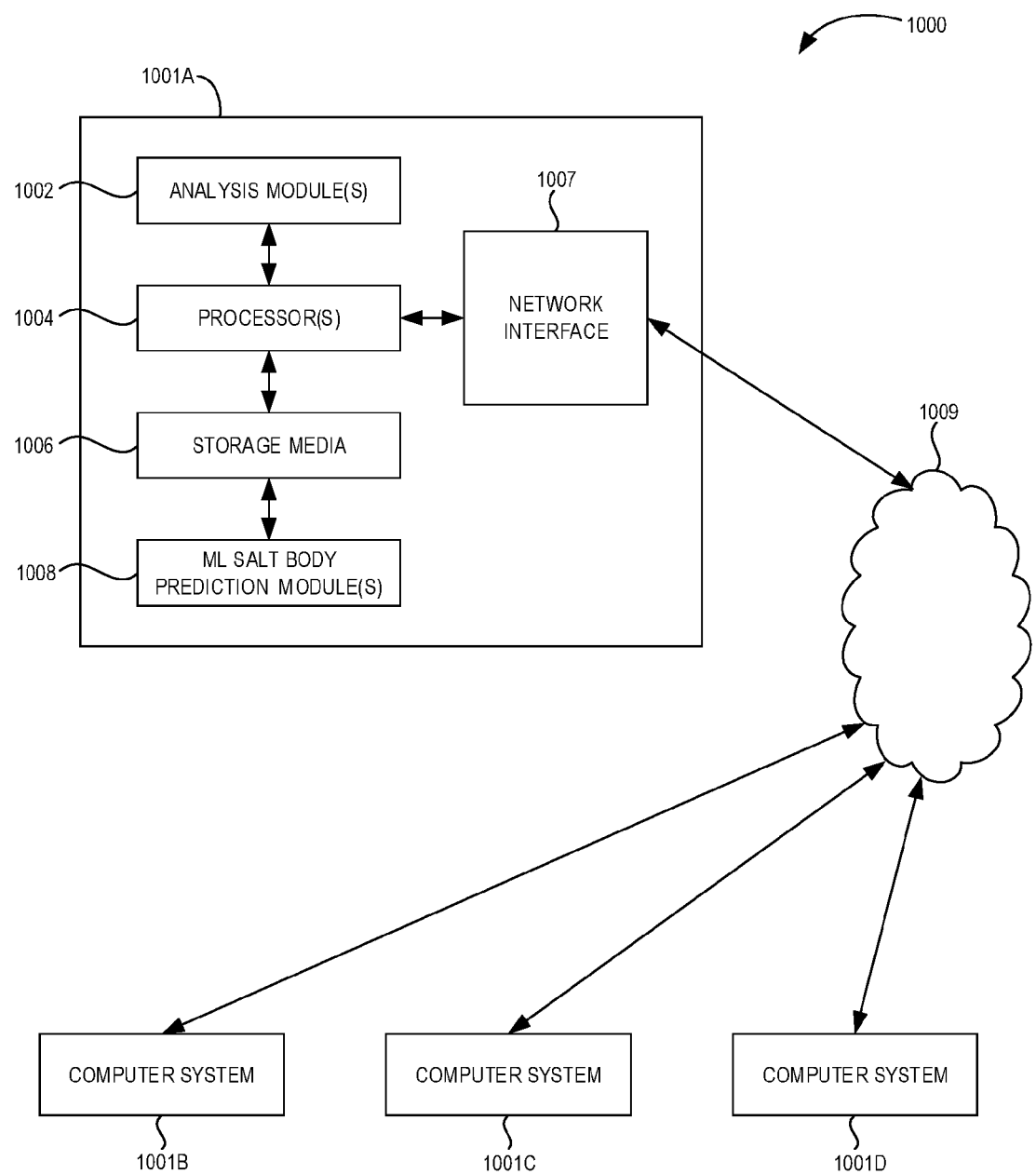
FIG. 10 illustrates a schematic view of a computing system, according to an embodiment.

In some embodiments, any of the methods of the present disclosure may be executed by a computing system. FIG. 10 illustrates an example of such a computing system 1000, in accordance with some embodiments. The computing system 1000 may include a computer or computer system 1001A, which may be an individual computer system 1001A or an arrangement of distributed computer systems. The computer system 1001A includes one or more analysis module(s) 1002 configured to perform various tasks according to some embodiments, such as one or more methods disclosed herein. To perform these various tasks, the analysis module 1002 executes independently, or in coordination with, one or more processors 1004, which is (or are) connected to one or more storage media 1006. The processor(s) 1004 is (or are) also connected to a network interface 1007 to allow the computer system 1001A to communicate over a data network 1009 with one or more additional computer systems and/or computing systems, such as 1001B, 1001C, and/or 1001D (note that computer systems 1001B, 1001C and/or 1001D may or may not share the same architecture as computer system 1001A, and may be located in different physical locations, e.g., computer systems 1001A and 1001B may be located in a processing facility, while in communication with one or more computer systems such as 1001C and/or 1001D that are located in one or more data centers, and/or located in varying countries on different continents).

A processor can include a microprocessor, microcontroller, processor module or subsystem, programmable integrated circuit, programmable gate array, or another control or computing device.

The storage media 1006 can be implemented as one or more computer-readable or machine-readable storage media. Note that while in the example embodiment of FIG. 10 storage media 1006 is depicted as within computer system 1001A, in some embodiments, storage media 1006 may be distributed within and/or across multiple internal and/or external enclosures of computing system 1001A and/or additional computing systems. Storage media 1006 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY© disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1000 contains one or more machine learning (ML) salt mask prediction module(s) 1008. In the example of computing system 1000, computer system 1001A includes the salt mask prediction module 1008. In some embodiments, a single salt mask prediction module may be used to perform some or all aspects of one or more embodiments of the methods. In alternate embodiments, a plurality of salt mask prediction modules may be used to perform some or all aspects of the methods.

It should be appreciated that computing system 1000 is only one example of a computing system, and that computing system 1000 may have more or fewer components than shown, may combine additional components not depicted in the example embodiment of FIG. 10, and/or computing system 1000 may have a different configuration or arrangement of the components depicted in FIG. 10. The various components shown in FIG. 10 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of embodiments of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 1000, FIG. 10), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the embodiments of the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the embodiments of the invention and its practical applications, to thereby enable others skilled in the art to best utilize the embodiments of the invention and various embodiments with various modifications as are suited to the particular use contemplated.

What is claimed is:

1. A method, comprising:
   receiving seismic data and an initial velocity model;
   generating a first seismic image based at least in part on the seismic data and the initial velocity model;
   training a machine learning model to predict salt masks based at least in part on seismic images, training includes using a first salt mask and the seismic image as a training couple;
   merging the initial velocity model and the first salt mask to generate a first modified velocity model;
   generating an updated velocity model based at least in part on the first modified velocity model;
   generating a second seismic image based at least in part on the updated velocity model;
   predicting a second salt mask based at least in part on the second seismic image and the updated velocity model, using the trained machine learning model; and
   merging the updated velocity model and the second salt mask to generate a second modified velocity model.

2. The method of claim 1, comprising visualizing the second modified velocity model, the second salt mask, or both for view by a human operator.

3. The method of claim 1, wherein generating the first seismic image includes performing a reverse time migration of the seismic data based on the initial velocity model.

4. The method of claim 3, wherein generating the second seismic image includes performing a reverse time migration of the seismic data based on the updated velocity model.

5. The method of claim 1, comprising validating the second salt mask against one or more salt masks picked by a human interpreter.

6. The method of claim 1, wherein generating the updated velocity model includes performing a full waveform inversion of the first modified velocity model.

7. The method of claim 1, comprising adjusting one or more parameters of the updated velocity model through parameterization.

8. The method of claim 1, comprising generating the first salt mask based on input from a human-user based at least in part on the first seismic image.

9. A computing system, comprising:
one or more processors; and
a memory system including one or more non-transitory, computer-readable media storing instructions that, when executed by at least one of the one or more processors, cause the computing system to perform operations, the operations including:
receiving seismic data and an initial velocity model;
generating a first seismic image based at least in part on the seismic data and the initial velocity model;
training a machine learning model to predict salt masks based at least in part on seismic images, the training includes using a first salt mask and the seismic image as a training couple;
merging the initial velocity model and the first salt mask to generate a first modified velocity model;
generating an updated velocity model based at least in part on the first modified velocity model;
generating a second seismic image based at least in part on the updated velocity model;
predicting a second salt mask based at least in part on the second seismic image and the updated velocity model, using the trained machine learning model; and
merging the updated velocity model and the second salt mask to generate a second modified velocity model.

10. The system of claim 9, wherein the operations include visualizing the second modified velocity model, the second salt mask, or both for view by a human operator.

11. The system of claim 9, wherein generating the first seismic image includes performing a reverse time migration of the seismic data based on the initial velocity model.

12. The system of claim 11, wherein generating the second seismic image includes performing a reverse time migration of the seismic data based on the updated velocity model.

13. The system of claim 9, wherein the operations include validating the second salt mask against one or more salt masks picked by a human interpreter.

14. The system of claim 9, wherein generating the updated velocity model includes performing a full waveform inversion of the first modified velocity model.

15. The system of claim 9, wherein the operations include adjusting one or more parameters of the updated velocity model through parameterization.

16. The system of claim 9, wherein the operations include generating the first salt mask based on input from a human-user based at least in part on the first seismic image.

17. A non-transitory, computer-readable medium storing instructions that, when executed by one or more processors of a computing system, cause the computing system to perform operations, the operations comprising:
receiving seismic data and an initial velocity model;
generating a first seismic image based at least in part on the seismic data and the initial velocity model;
training a machine learning model to predict salt masks based at least in part on seismic images, the training includes using a first salt mask and the seismic image as a training couple;
merging the initial velocity model and the first salt mask to generate a first modified velocity model;
generating an updated velocity model based at least in part on the first modified velocity model;
generating a second seismic image based at least in part on the updated velocity model;
predicting a second salt mask based at least in part on the second seismic image and the updated velocity model, using the trained machine learning model; and
merging the updated velocity model and the second salt mask to generate a second modified velocity model.

18. The medium of claim 17, wherein generating the first seismic image includes performing a reverse time migration of the seismic data based on the initial velocity model.

19. The medium of claim 18, wherein generating the second seismic image includes performing a reverse time migration of the seismic data based on the updated velocity model, and generating the updated velocity model includes performing a full waveform inversion of the first modified velocity model.

20. The medium of claim 17, wherein the operations include generating the first salt mask based on input from a human-user based at least in part on the first seismic image.

* * * * *